(12) United States Patent
Kawashima

(10) Patent No.: US 8,901,206 B2
(45) Date of Patent: Dec. 2, 2014

(54) NATURAL RUBBER, RUBBER COMPOSITION USING THE SAME, AND TIRE

(75) Inventor: Masahiro Kawashima, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 13/983,175

(22) PCT Filed: Feb. 3, 2012

(86) PCT No.: PCT/JP2012/052476
§ 371 (c)(1),
(2), (4) Date: Aug. 1, 2013

(87) PCT Pub. No.: WO2012/105681
PCT Pub. Date: Aug. 9, 2012

(65) Prior Publication Data
US 2013/0303686 A1 Nov. 14, 2013

(30) Foreign Application Priority Data
Feb. 3, 2011 (JP) .................... 2011-021998

(51) Int. Cl.
C08C 1/08 (2006.01)
C08K 5/47 (2006.01)
C08L 7/00 (2006.01)
B60C 1/00 (2006.01)

(52) U.S. Cl.
CPC ... C08L 7/00 (2013.01); C08K 5/47 (2013.01); B60C 1/00 (2013.01)
USPC .................... 523/335; 523/200; 524/575.5

(58) Field of Classification Search
CPC ........... C08L 7/00; C08L 7/02; C08K 5/0008; C08K 5/01
USPC ................ 523/200, 335; 524/575.5
See application file for complete search history.

(56) References Cited

U.S. PATENT DOCUMENTS

| | | | | |
|---|---|---|---|---|
| 2,802,893 A | * | 8/1957 | Rand et al. | 528/489 |
| 2,888,504 A | * | 5/1959 | Ten Broeck, Jr. | 524/83 |
| 5,234,988 A | * | 8/1993 | Brooks et al. | 524/526 |
| 2006/0052518 A1 | * | 3/2006 | Kondou | 524/575.5 |

FOREIGN PATENT DOCUMENTS

| | | |
|---|---|---|
| JP | 2001-123015 A | 5/2001 |
| JP | 2002-285414 A | 10/2002 |
| JP | 2003-313366 A | 11/2003 |
| JP | 2006-056930 A | 3/2006 |
| JP | 2007-161925 A | 6/2007 |
| JP | 2007-204545 A | 8/2007 |
| JP | 2007-284637 A | 11/2007 |
| JP | 2010-144001 A | 7/2010 |

OTHER PUBLICATIONS

Proxel BZ Plus Preservative.: Arch Chemicals, Inc., 2009 [online] URL:<http://www.archbioacids.com/proxelbzplus.com>.*
International Search Report for PCT/JP2012/052476, dated Feb. 28, 2012.

* cited by examiner

*Primary Examiner* — Hannah Pak
(74) *Attorney, Agent, or Firm* — Sughrue Mion, PLLC

(57) ABSTRACT

The natural rubber of the present invention is natural rubber obtained by leaving standing for a prescribed period of time a hydrous coagulum obtained from a natural rubber latex to which a preservative is added and/or from a coagulum of a natural rubber latex to which a preservative is added and drying it. The natural rubber coagulum is inhibited from being changed in a molecular weight even in a standing step (aging) in a high moisture condition, whereby the natural rubber having stable mechanical properties is obtained. An isothiazoline base compound is used for the preservative. Further, a rubber composition containing the natural rubber is prepared, and a tire is produced by using the rubber composition.

3 Claims, No Drawings

NATURAL RUBBER, RUBBER COMPOSITION USING THE SAME, AND TIRE

CROSS REFERENCE TO RELATED APPLICATIONS

This application is a National Stage of International Application No. PCT/JP2012/052476 filed Feb. 3, 2012, claiming priority based on Japanese Patent Application No. 2011-021998 filed Feb. 3, 2011, the contents of all of which are incorporated herein by reference in their entirety.

TECHNICAL FIELD

The present invention relates to natural rubber, a rubber composition prepared by using the same, and a tire, specifically to natural rubber comprising a natural rubber coagulum changed less with the passage of time in a standing step (aging or maturation) in which a moisture is contained after coagulating a natural rubber latex, a rubber composition prepared by using the same, and a tire prepared by using the rubber composition.

In this respect, maturation means standing for a certain period of time in a condition containing a moisture, and changing with the passage of time means changing in a molecular weight of an polyisoprene chain and contents of non-rubber components such as proteins and lipids in a natural rubber coagulum. Proteins having an anti-aging action and a vulcanization accelerating action are contained in the non-rubber components. A rubber composition comprising natural rubber obtained by preventing the non-rubber components from flowing out from the natural rubber coagulum and positively fixing them in the natural rubber coagulum by aging and then washing and drying it can be expected to be improved in an anti-aging property.

BACKGROUND ART

In general, a natural rubber coagulum produced from a cup lump contains a moisture in a standing step thereof. Accordingly, bacteria and microorganisms contained in the coagulum are proliferated and activated, and proteins and lipids which are non-rubber components in the natural rubber coagulum are decomposed thereby. Also, a polyisoprene chain itself of natural rubber is influenced thereby as well and decreased in a molecular weight in a standing step.

Reduction in a molecular weight of a natural rubber coagulum containing a moisture in a standing step brings about marked reduction in physical properties such as a modulus and a tensile stress in the rubber composition thereof. Also, a change in a natural rubber coagulum with the passage of time in a standing step is dispersed to a large extent, and the targeted physical properties are not obtained in the rubber composition thereof in a certain case. The variation in a change with the passage of time which is referred to in the above case is variation in a change with the passage of time in the natural rubber coagulum itself in a certain period and variation originating in a difference of a standing period of the natural rubber coagulum.

Known are natural rubber latices to which preservatives, fungicides and bacteriostatic agents are added for the purpose of inhibiting proteins and lipids which are non-rubber components in a natural rubber latex from being decomposed by microorganisms in order to obtain a highly stable natural rubber latex which is not coagulated even after left standing for a long period in a nearly neutral pH region from a weak acidity to a weak alkalinity (refer to patent documents 1 and 2). The purposes of the above procedures are to secure stability of a natural rubber latex in a standing step and/or simplification of treatments in subsequent steps.

In recent years, a natural rubber coagulum originating in a cup lump is increased in use thereof. In the production process of the natural rubber described above, natural rubber latices gathered in farms and plantations are coagulated, and the coagulation products are delivered to processing plants in the form of natural rubber coagulums in a principal case. The natural rubber coagulums are left standing for various periods, and reduction and variation in the physical properties of the natural rubber described above are caused by a difference in time of standing them, and that is a large problem. Further, a difference in the physical properties of the natural rubber coagulum which originates in a storing condition thereof in a standing step is a problem as well, and it is desired to stabilize the physical properties of the natural rubber coagulum and inhibit the physical properties thereof from being dispersed due to a difference in a standing period.

PRIOR ART DOCUMENTS

Patent Documents

Patent document 1: Japanese Patent Application Laid-open No. 2007-204545
Patent document 2: Japanese Patent Application Laid-open No. 2007-284637

OUTLINE OF THE INVENTION

Problems to be Solved by the Invention

An object of the present invention is to solve the foregoing problems of the conventional arts and provide natural rubber comprising a natural rubber coagulum and having stable mechanical properties wherein the natural rubber coagulum is inhibited in reduction of a molecular weight and a change in the quality of non-rubber components even in a standing step (aging) residing in a high moisture content condition to thereby be inhibited from varying in a quality and contains stably the non-rubber components. Also, another object of the present invention is to provide a rubber composition prepared by using the natural rubber and a tire prepared by using the same.

Means for Solving the Problems

That is, in the present invention, the purposes described above are achieved by the following constitution and structure.

(1) Natural rubber obtained by leaving standing for three days or longer a hydrous coagulum obtained from a natural rubber latex to which a preservative is added and/or from a coagulum of a natural rubber latex to which a preservative is added and then washing and drying the hydrous coagulum.
(2) The natural rubber as described in the above item (1), wherein the preservative is 1,2-benzisothiazoline-3-one.
(3) The natural rubber as described in the above item (1) or (2), wherein an addition amount of the preservative is 0.01 to 1.0% by mass based on the natural rubber coagulum.
Moreover, the standing period of time is preferably at least three days or longer, more preferably five days or longer.
(4) A rubber composition comprising the natural rubber as described in any one of the above items (1) to (3).

(5) A tire produced by using the rubber composition as described in the above item (4).

Effects of the Invention

The natural rubber of the present invention is natural rubber obtained by coagulating a natural rubber latex, subjecting the coagulum to aging for a prescribed period of time and drying it, and the presence of the preservative in the hydrous coagulum prevents non-rubber components from flowing out without being changed in a quality thereof in the aging and inhibits the coagulum from being changed with the passage of time, whereby the natural rubber having stable mechanical properties is obtained after drying the coagulum. Usually, when a natural rubber coagulum is left standing over a long period of time in a hydrous condition, microorganisms are proliferated so that non-rubber components are decomposed or changed in a quality. However, the natural rubber of the present invention is prevented from such a change.

Also, since the natural rubber comprising the natural rubber coagulum described above containing non-rubber components in a good condition without being changed in a quality thereof is used in the rubber composition of the present invention, the rubber composition is enhanced in mechanical properties such as a modulus and a tensile stress and improved in a vulcanization accelerating action, and further it is advanced in an anti-aging characteristic. The tire of the present invention can be expected to be endowed with good tire performances by using the rubber composition described above.

MODE FOR CARRYING OUT THE INVENTION

The embodiments of the present invention shall be explained below. Incidentally, it is a matter of course that the natural rubber and the rubber composition according to the present invention shall not be restricted to the following embodiments and that they can be changed in various manners as long as they do not deviate from the scope of the present invention.

The natural rubber coagulum in the present embodiment is obtained by leaving standing for a prescribed period of time a hydrous coagulum obtained from a natural rubber latex to which a preservative is added and/or obtained by adding a preservative to a coagulum of a natural rubber latex, and the natural rubber is obtained by washing and drying the above hydrous coagulum.

Usually, a production method of natural rubber includes typical two methods. In a ribbed smoked sheet (RSS) according to grading in an International Standards of Quality and Packing for Natural Rubber Grades (usually called a green book), a rubber component contained in a natural rubber latex gathered after tapping is coagulated by an acid and the like; the solid rubber is separated from water-soluble non-rubber components by a milling roll; and the solid rubber is subjected to smoking drying (smoking) at about 60° C. for 5 to 7 days. Also, in technically specified rubbers (TSR), a rubber component in a natural rubber latex is naturally coagulated or coagulated (cup lump) by an acid after tapping, and the solid rubber is crushed, washed with water, dehydrated and then dried by hot air at 110 to 140° C. for several hours.

The present embodiment is, to be specific, to obtain a natural rubber by leaving standing (aging) for a prescribed period of time a coagulum obtained from a natural rubber latex before coagulating to which a preservative is added or a coagulum obtained by adding a preservative to a cup lump containing a moisture and then washing and drying it.

The natural rubber latex includes, for example, a fresh latex obtained from a natural rubber tree and used within 3 hours after tapping and a latex which is tapped and then stabilized by ammonia treatment and the like and which contains a stabilizer and has preferably a pH of about 7.0 to 11.0. Also, centrifugally separated latices obtained by centrifugally separating the above lattices by means of a centrifugal separator can be used.

Specifically, the natural rubber latex having a solid content falling in a range of 10 to 80% by mass is preferably used, and the natural rubber latex having a solid content falling in a range of 20 to 65% by mass is particularly preferably used.

The coagulation treatment may be carried out by the natural coagulation described above and may be carried out by chemical treatment by a coagulation acid and the like.

The coagulation acid in the chemical treatment may be either an organic acid or an inorganic acid, and, for example, formic acid, citric acid, phosphoric acid, sulfuric acid and the like can be listed as a representative thereof.

In the natural rubber coagulum of the present embodiment, the preservative is added, and then the aging described above is carried out. The aging time is preferably at least 3 days or longer, and it falls more preferably in a range of 5 days or longer and 60 days or shorter. The duration shorter than the range described above causes the non-rubber components to flow out to a small extent and exerts less influence on the physical properties due to reduction in the molecular weight, and therefore a merit is scarcely provided by adding the preservative. Also, the duration exceeding the range described above causes the effect of preventing the non-rubber components from further flowing out to be next to nothing and results in wasting the production time.

The temperature in aging is room temperature but shall not be restricted to the temperature, and the natural rubber coagulum may be put in a place subjected to cooling and warming treatment in a range of 5 to 40° C.

Various preservatives which can inhibit the actions of microorganisms can be used as the preservative in the present embodiment. 1,2-Benzisothiazoline-3-one is particularly preferred for the preservative from the viewpoints that it has a high effect of inhibiting the activity of microorganisms and that it exerts a low load on the environment. Further, it includes as well 2-pyridinethiol-1-oxide sodium salt, 2-pyridinethiol-1-oxide zinc salt, 2-methyl-4-isothiazoline-3-one, 5-chloro-2-methyl-4-isothiazoline-3-one, 3-iodo-2-propynylbutyl carbamate and the like.

Also, an addition amount of the preservative to the natural rubber coagulum is 0.01 to 1.00% by mass, preferably 0.1 to 0.8% by mass and particularly preferably 0.2 to 0.5% by mass based on the total amount of the natural rubber coagulum. If an addition amount of the preservative is less than 0.01% by mass, the targeted preservation effect can not be exerted in a certain case. If it exceeds 1.00% by mass, the economical cost corresponding to the preservation effect is increased, and the preservative is likely to remain in the natural rubber coagulum to exert an adverse effect thereon.

In the present embodiment, the natural rubber coagulum subjected to the aging treatment is subjected preferably to crumbing treatment before drying. The crumbing treatment is not necessarily required and is carried out for efficient drying. For example, the crumbing treatment can be carried out by passing through a creper process and/or a shredder process. In the creper process, the coagulum can be caused to pass three times through, for example, Creper Model CRC14/28 manufactured by SPHERE Inc. to obtain creper sheets, and in the shredder process, the creper sheets can be caused to pass through, for example, Shredder Model CRC14/28 manufactured by SPHERE Inc. to obtain crumbs.

The drying treatment of the coagulum described above can be carried out by means of, for example, a bucket type dryer or a belt type dryer. The bucket type dryer includes, for example, a dryer used usually for producing TSR, to be specific, Single Box Dryer Model CRDS manufactured by SPHERE Inc. Also, the belt type dryer includes a conveyor type dryer, for example, a dryer equipped with a far-infrared device or a microwave device. The coagulum described above is dried preferably until a moisture content of the natural rubber coagulum reaches preferably 1.5% or less, more preferably 0.8% or less from the viewpoints of kneading stability and physical property stability of the compounded rubber.

In the natural rubber of the present embodiment, a viscosity stabilizer may be added to the rubber latex together with the preservative or after aging. This compounding makes it possible to inhibit the viscosity from being elevated before and during the drying process and inhibit the viscosity from being elevated at the subsequent processes, and that results in always obtaining the homogeneous natural rubber raw material. Accordingly, a mixer used in a mastication process after drying is not necessarily required in a tire factory and the like.

The viscosity stabilizer includes, for example, hydroxylamine sulfate, semicarbazide, dimedone (1,1-dimethylcyclohexane-3,5-dione), triazole compounds, hydrazide compounds and the like. The hydrazide compounds include, for example, acetohydrazide, propionic acid hydrazide, butanoic acid hydrazide, lauric acid hydrazide, palmitic acid hydrazide, stearic acid hydrazide, cyclopropanecarboxylic acid hydrazide, cyclohexanecarboxylic acid hydrazide, cycloheptanecarboxylic acid hydrazide, benzoic acid hydrazide, o-, m-, p-toluic acid hydrazide, p-methoxybenzoic acid hydrazide, 3,5-dimethylbenzoic acid hydrazide and 1-naphthoic acid hydrazide. Also, the triazole compounds include 1,2,4-triazole, 3-amino-1,2,4-triazole, 4-amino-1,2,4-triazole, 3-mercapto-1,2,4-triazole, 1,2,4-triazole-3-ol, 5-amino-3-mercapto-1,2,4-triazole, 5-amino-1,2,4-triazole, 1,2,4-triazole-3-carboxylic acid, benzotriazole, 1-hydroxybenzotriazole (monohydrate) and the like.

Further, an addition amount of the viscosity stabilizer to the natural rubber is 0.001 to 3% by mass, preferably 0.03 to 2.5% by mass based on the total amount of the natural rubber (crude rubber). If an addition amount of the viscosity stabilizer is less than 0.001% by mass, the targeted viscosity stabilizing effect can not be exerted in a certain case. Also, if it exceeds 3% by mass, the viscosity stabilizer remains in the natural rubber, and the rubber composition prepared by using the viscosity stabilizer is reduced in low hysteresis loss property and durability in a certain case. Also, dispersibility of the compounding ingredients as well as carbon black is reduced in a certain case, and therefore that is not preferred.

Next, the rubber composition of the present embodiment is prepared by compounding rubber components including the natural rubber, and the natural rubber comprises the natural rubber coagulum described above.

Various synthetic rubbers in addition to natural rubber including the natural rubber described above can be used for the rubber components in the rubber composition. Diene base synthetic rubbers are preferably used from the viewpoint of compatibility between polymers (even dispersion). The diene base synthetic rubbers which can be used include, for example, at least one selected from polyisoprene rubbers, styrene-butadiene copolymer rubbers, polybutadiene rubbers and styrene-polyisoprene copolymer rubbers. In particular, at least one selected from polyisoprene rubbers, styrene-butadiene copolymer rubbers and polybutadiene rubbers is preferred from the viewpoint of heat resistance. In the rubber composition of the present invention, a content of the natural rubber obtained above is 5% by mass or more, preferably 10 to 70% by mass based on the total amount of the whole rubber components. If a content of the natural rubber is less than 5% by mass, the effect of improving the viscosity and the low hysteresis loss property is not exerted, and therefore it is not preferred.

In the rubber composition thus constituted according to the present embodiment, obtained is the rubber composition which is compounded with the rubber components including the natural rubber having an excellent heat resistant anti-aging property and which is not elevated in a viscosity in storing and has a stable quality. Further, in the production process of the natural rubber according to the present embodiment, the natural rubber which is excellent in dispersibility and exerts an excellent viscosity stabilization effect and which is always homogeneous is obtained. The rubber composition containing the natural rubber obtained at the working process described above may contain, if necessary, optional components such as a filler, a reinforcing agent, a softener, a vulcanizing agent, a vulcanization accelerator, a vulcanization accelerator activator and an antioxidant. The natural rubber can be used widely in the rubber industry and the tire industry because of excellent physical properties thereof, and it is used particularly preferably for tire rubbers.

EXAMPLES

The present invention shall be more specifically explained below in detail with reference to examples and comparative examples, but the present invention shall not be restricted to the following examples.

A natural rubber latex to which 0.4% by mass of ammonia was added was concentrated by centrifugally separating by means of a continuous latex separator to prepare a latex having 40% by mass of a rubber solid content (DRC) in the resulting concentrated latex.

Examples 1 to 6

1,2-Benzisothiazoline-3-one (preservative 1) of 0.5 part by mass based on 100 parts by mass of the rubber solid content was added as a preservative to the natural rubber latex described above, and the latex was naturally coagulated (cup lump) and aged at a temperature of 25° C. for maximum 35 days.

Examples 7 to 8

The preservative 1 of 0.1 part by mass based on 100 parts by mass of the rubber solid content was added as a preservative to the natural rubber latex described above, and the latex was naturally coagulated (cup lump) and aged at a temperature of 25° C. for 3 or 5 days.

Examples 9 to 10

The preservative 1 of 0.3 part by mass based on 100 parts by mass of the rubber solid content was added as a preservative to the natural rubber latex described above, and the latex was naturally coagulated (cup lump) and aged at a temperature of 25° C. for 3 or 5 days.

Examples 11 to 12

The preservative 1 of 0.8 part by mass based on 100 parts by mass of the rubber solid content was added as a preservative to the natural rubber latex described above, and the latex was naturally coagulated (cup lump) and aged at a temperature of 25° C. for 3 or 5 days.

Example 13

5-Chloro-2-methyl-4-isothiazoline-3-one (preservative 2) of 0.5 part by mass based on 100 parts by mass of the rubber solid content was added as a preservative to the natural rubber latex described above, and the latex was naturally coagulated (cup lump) and aged at a temperature of 25° C. for 3 days.

Example 14

The preservative 2 of 0.8 part by mass based on 100 parts by mass of the rubber solid content was added as a preservative to the natural rubber latex described above, and the latex was naturally coagulated (cup lump) and aged at a temperature of 25° C. for 3 days.

Comparative Examples 1 to 4

The preservative was not added to the natural rubber latex described above, and the natural rubber latex was naturally coagulated (cup lump) and aged at a temperature of 25° C. for maximum 35 days.

Comparative Example 5

The preservative 1 of 0.5 part by mass based on 100 parts by mass of the rubber solid content was added to the natural rubber latex described above, and the latex was naturally coagulated (cup lump), and it was not aged.

The natural rubber coagulum (after aging) described above were crushed (crumbed) by causing them to pass through a crusher, a creper three times and a shredder. The coagulum crushed were washed, dehydrated and dried to obtain natural rubbers.

Evaluation Methods

Measuring Method of Nitrogen Content:

A whole nitrogen content of the natural rubber was measured by a Kjeldahl method, and the nitrogen content was calculated in terms of a proportion (% by mass) based on the total amount of the natural rubber.

Measuring Method of Molecular Weight (Mw):

A gel permeation chromatography (GPC: HLC-8020 manufactured by Tosoh Corporation, column: GMH-XL manufactured by Tosoh Corporation, detector: differential refractometer (RI)) was used to determine a weight average molecular weight of the respective natural rubbers in terms of polystyrene based on standard polystyrene manufactured by Tosoh Corporation.

Measuring Method of Tensile Strength:

A rubber composition was prepared according to a recipe shown in Table 2 and vulcanized on the conditions of a temperature of 145° C. and 33 minutes to obtain a trial rubber sheet. This sheet was punched in a ring form, and then it was used to measure a stress in breaking by means of a tensile tester. The value was shown by an index, wherein that of Comparative Example 1 was set to 100. It is shown that the higher the numeral value is, the better the tensile strength is.

Measuring Method of Anti-aging Property:

The trial rubber described above was left standing still in an oven of 100° C. for 49 hours to thereby obtain a deteriorated trial rubber. This was punched in a ring form, and then it was used to measure a 300% modulus by means of a tensile tester to determine an anti-aging property. The value was shown by an index, wherein that of Comparative Example 1 was set to 100. It is shown that the higher the numeral value is, the better the anti-aging property is.

The evaluation results of the examples and the comparative examples are shown in Table 1. The molecular weight is shown by a numeral value of $X \cdot 10^{-4}$.

TABLE 1

|  | Comparative Example ||||| Example |||||
| --- | --- | --- | --- | --- | --- | --- | --- | --- | --- | --- |
|  | 1 | 2 | 3 | 4 | 5 | 1 | 2 | 3 | 4 | 5 |
| Addition of preservative | X | X | X | X | ○ | ○ | ○ | ○ | ○ | ○ |
| Preservative used | — | — | — | — | 1,2-benzisothiazoline-3-one |||||| 
| Addition amount of preservative | — | — | — | — | 0.5 | 0.5 | 0.5 | 0.5 | 0.5 | 0.5 |
| Duration from addition of preservative to drying | 0 day | 3 days | 7 days | 35 days | 0 day | 3 days | 5 days | 7 days | 14 days | 21 days |
| Nitrogen content | 0.465 | 0.441 | 0.399 | 0.237 | 0.460 | 0.469 | 0.483 | 0.487 | 0.493 | 0.497 |
| NR molecular weight | 175.4 | 169.5 | 109.1 | 75.0 | 172.5 | 170.9 | 168.1 | 162.5 | 160.5 | 158.9 |
| Tensile strength | 100 | 95 | 91 | 86 | 100 | 100 | 102 | 102 | 104 | 105 |
| Anti-aging property | 100 | 96 | 93 | 87 | 99 | 101 | 105 | 106 | 106 | 108 |

|  | Example |||||||||
| --- | --- | --- | --- | --- | --- | --- | --- | --- | --- |
|  | 6 | 7 | 8 | 9 | 10 | 11 | 12 | 13 | 14 |
| Addition of preservative | ○ | ○ | ○ | ○ | ○ | ○ | ○ | ○ | ○ |
| Preservative used | 1,2-benzisothiazoline-3-one ||||||| 5-chloro-2-methyl-4-isothiazoline-3-one ||
| Addition amount of preservative | 0.5 | 0.1 | 0.1 | 0.3 | 0.3 | 0.8 | 0.8 | 0.5 | 0.8 |
| Duration from addition of preservative to drying | 35 days | 3 days | 5 days | 3 days | 5 days | 3 days | 5 days | 3 days | 3 days |
| Nitrogen content | 0.498 | 0.437 | 0.446 | 0.474 | 0.479 | 0.479 | 0.488 | 0.465 | 0.483 |
| NR molecular weight | 157.1 | 165.7 | 168.0 | 167.8 | 167.6 | 169.1 | 168.5 | 172.2 | 168.2 |
| Tensile strength | 105 | 99 | 101 | 101 | 102 | 101 | 102 | 101 | 100 |
| Anti-aging property | 110 | 98 | 101 | 103 | 104 | 102 | 106 | 100 | 102 |

The nitrogen content (% by mass) after left standing for a prescribed period of time was notably reduced in standing without adding the preservative, but the nitrogen content was not observed to be reduced in standing with the preservative being added, and the non-rubber components were inhibited from being decomposed and flowing out. In particular, the natural rubber which was stored for a long period was increased in a nitrogen content due to an increase of the non-rubber components remained.

The natural rubber after left standing for a prescribed period of time was notably decreased in a weight average molecular weight (X $10^{-4}$ [Da]) in standing without adding the preservative, but it was inhibited to a large extent from being decreased in a weight average molecular weight in standing with the preservative being added.

The rubber composition containing the foregoing natural rubber after left standing for a prescribed period of time was notably decreased in a tensile strength in standing without adding the preservative, but it was inhibited to a large extent from being decreased in a tensile strength in standing with the preservative being added.

The rubber composition containing the foregoing natural rubber after left standing for a prescribed period of time was notably decreased in an anti-aging property in standing without adding the preservative, but it was inhibited to a large extent from being decreased in an anti-aging property in standing with the preservative being added.

TABLE 2

| Respective components of rubber composition | Parts by mass |
| --- | --- |
| Natural rubber | 100 |
| Carbon black ISAF | 41 |
| Anti-aging agent 6C*1) | 2 |
| Stearic acid | 2 |
| Zinc oxide | 3.5 |
| Vulcanization accelerator CZ*2) | 1 |
| Sulfur | 1.3 |

*1)N-(1,3-dimethylbutyl)-N'-phenyl-p-phenylenediamine: "Nocrac 6C" manufactured by Ouchi Shinko Chemical Industrial Co., Ltd.
*2)N-cyclohexyl-2-benzothiazylsulfeneamide: "Nocceler CZ" manufactured by Ouchi Shinko Chemical Industrial Co., Ltd.

Industrial Applicability

The natural rubber of the present invention has stable mechanical properties, and the rubber composition thereof can use the natural rubber described above which inhibits non-rubber components from flowing out without changing the properties thereof and which contains them in a good condition and has an industrial applicability.

What is claimed is:

1. Natural rubber containing non-rubber components obtained by leaving standing for 3 to 60 days at 5 to 40° C. a hydrous coagulum obtained from a natural rubber latex to which 1,2-benzisothiazoline-3-one is added and/or from a coagulum of a natural rubber latex to which 1,2-benzisothiazoline-3-one is added and then washing and drying the hydrous coagulum, wherein an addition amount of 1,2-benzisothiazoline-3-one is 0.1 to 0.8% by mass based on a natural rubber solid content.

2. A rubber composition comprising the natural rubber as described in claim 1.

3. A tire produced by using the rubber composition as described in claim 2.

* * * * *